(12) United States Patent
Muncy et al.

(10) Patent No.: US 10,888,979 B2
(45) Date of Patent: Jan. 12, 2021

(54) LOCKABLE SOCKET INSERT, INSERT TOOL AND INSERT LOCK AND METHOD OF MAKING AND USING THE SAME

(71) Applicant: Toyota Motor Engineering & Manufacturing North America, Inc., Plano, TX (US)

(72) Inventors: Chase O. Muncy, Haubstadt, IN (US); Dallas L. Barbre, Geff, IL (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 0 days.

(21) Appl. No.: 16/429,670

(22) Filed: Jun. 3, 2019

(65) Prior Publication Data
US 2020/0376634 A1    Dec. 3, 2020

(51) Int. Cl.
*B25B 23/00*        (2006.01)
*B25B 13/06*        (2006.01)
*B23B 31/113*       (2006.01)
*B23B 31/11*        (2006.01)

(52) U.S. Cl.
CPC ........ *B25B 23/0035* (2013.01); *B23B 31/113* (2013.01); *B25B 13/06* (2013.01); *B23B 31/11* (2013.01); *B23B 2231/028* (2013.01); *B23B 2231/0276* (2013.01); *B23B 2231/04* (2013.01); *Y10T 279/15* (2015.01); *Y10T 279/17888* (2015.01); *Y10T 279/3406* (2015.01)

(58) Field of Classification Search
CPC ... B25B 13/06; B25B 23/0035; B23B 31/113; B23B 2231/024; B23B 2231/0244; B23B 2231/026; B23B 2231/0264; B23B 2231/0276; B23B 2231/028; B23B 2231/04; B23B 31/11; Y10T 279/17888; Y10T 279/3406
See application file for complete search history.

(56) References Cited

U.S. PATENT DOCUMENTS

| | | |
|---|---|---|
| 3,241,408 A | 3/1966 | McCauley |
| 4,618,299 A | 10/1986 | Bainbridge et al. |
| 4,869,633 A | 9/1989 | Hayashi |
| 5,112,176 A | 5/1992 | McCauley et al. |

(Continued)

FOREIGN PATENT DOCUMENTS

| | | | | |
|---|---|---|---|---|
| DE | 102017004043 A1 | * | 10/2018 | ......... B25B 23/1427 |
| EP | 0848172 A1 | | 6/1998 | |

*Primary Examiner* — Eric A. Gates
(74) *Attorney, Agent, or Firm* — Christopher G. Darrow; Darrow Mustafa PC

(57) ABSTRACT

A lockable socket insert and insert lock comprises: a lockable socket insert comprising an insert axis, a cylindrical tool body comprising an free end, a shaft end, and a tool bore extending inwardly from the free end, and a cylindrical key shaft attached to the shaft end comprising a length, a shaft surface, and a plurality of circumferentially spaced key members disposed along the length and protruding radially outwardly away from the shaft surface, the cylindrical tool body, tool bore, and cylindrical key shaft concentric about the insert axis; and a cylindrical insert lock comprising an outer end configured for disposition toward the fastener pocket, a drive pocket end configured for disposition toward the drive pocket, an outer surface, and a keyway opening.

20 Claims, 5 Drawing Sheets

(56) References Cited

U.S. PATENT DOCUMENTS

| | | | | |
|---|---|---|---|---|
| 6,000,888 | A * | 12/1999 | Hartman | B23B 31/1071 408/239 R |
| 6,254,303 | B1 * | 7/2001 | Falat | B23B 31/113 403/321 |
| 7,036,401 | B2 * | 5/2006 | Carroll | B25B 13/06 81/124.4 |
| 7,101,127 | B2 * | 9/2006 | Kimura | B23B 31/06 408/239 A |
| 7,726,664 | B2 * | 6/2010 | Peters | B23B 31/005 279/143 |
| 8,109,183 | B2 * | 2/2012 | Santamarina | B25B 15/001 173/211 |
| 9,016,096 | B2 | 4/2015 | Winnie | |
| 9,468,977 | B2 * | 10/2016 | McCormick | B23B 31/08 |
| 10,556,275 | B2 * | 2/2020 | Hinshaw | B23B 31/008 |
| 2002/0014137 | A1 | 2/2002 | Lonnqvist et al. | |
| 2006/0228191 | A1 | 10/2006 | Ward, Jr. | |
| 2018/0169841 | A1 * | 6/2018 | Hinshaw | B23B 31/113 |
| 2018/0250981 | A1 | 9/2018 | Phillips | |
| 2019/0270188 | A1 * | 9/2019 | Zhang | B25B 23/0035 |

* cited by examiner

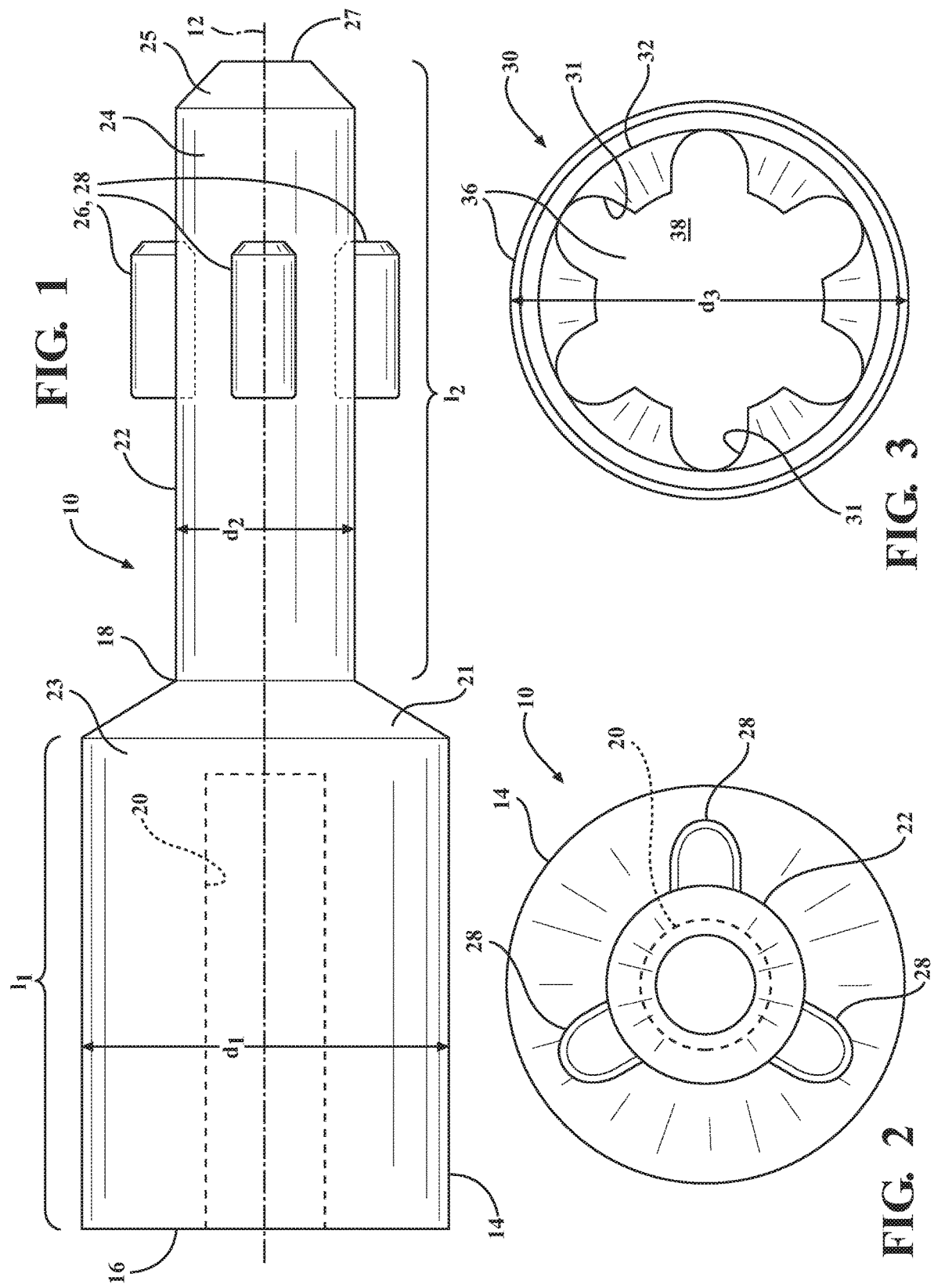

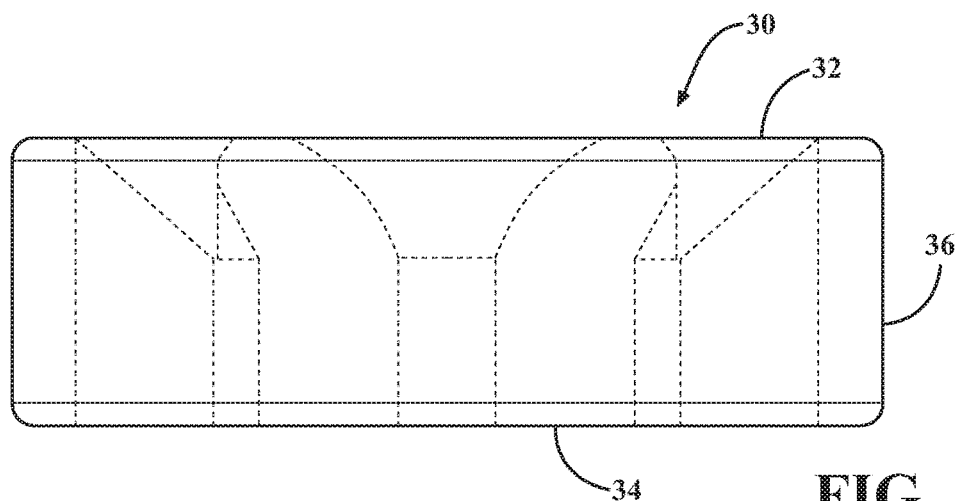
FIG. 4
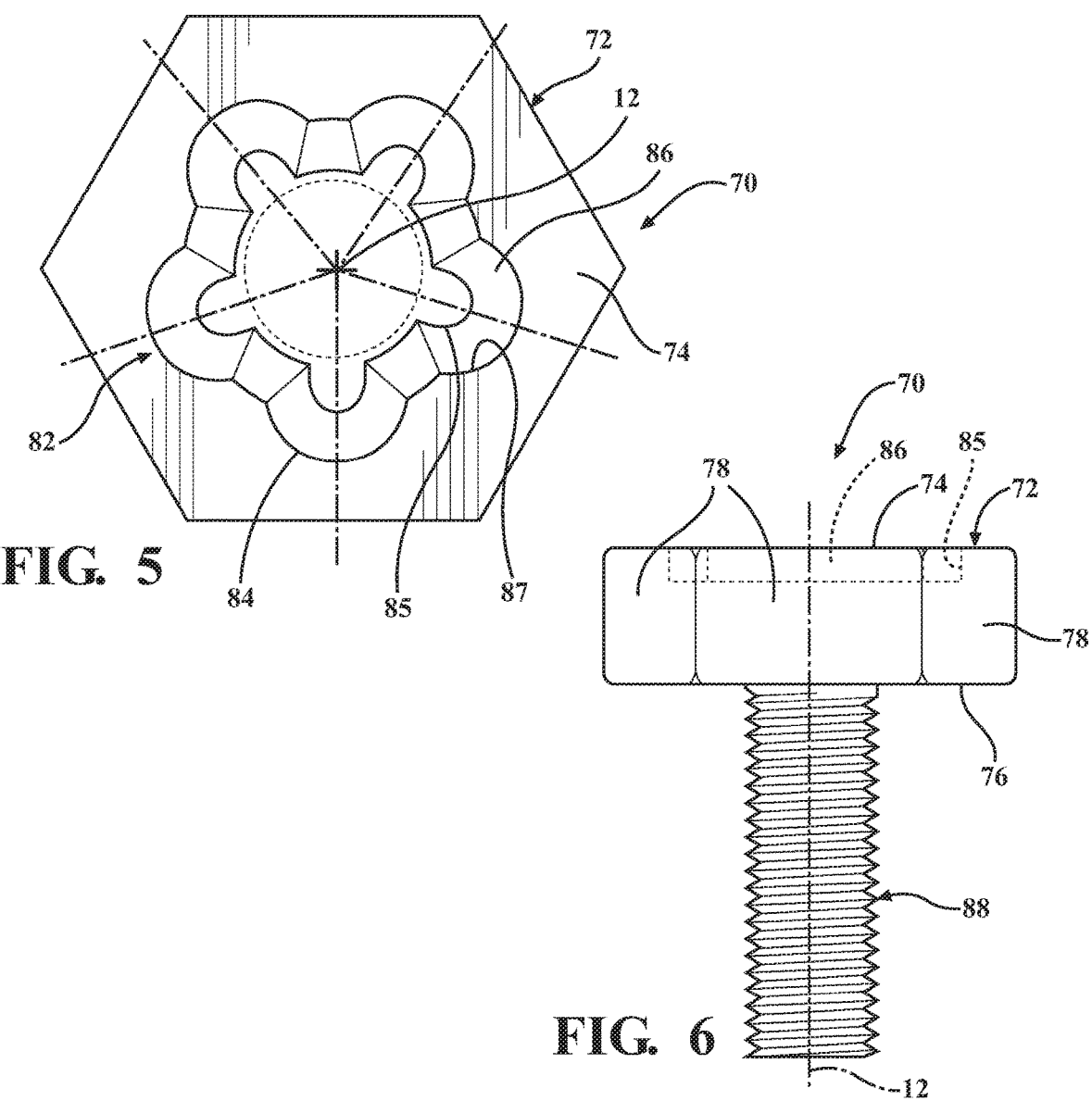
FIG. 5
FIG. 6

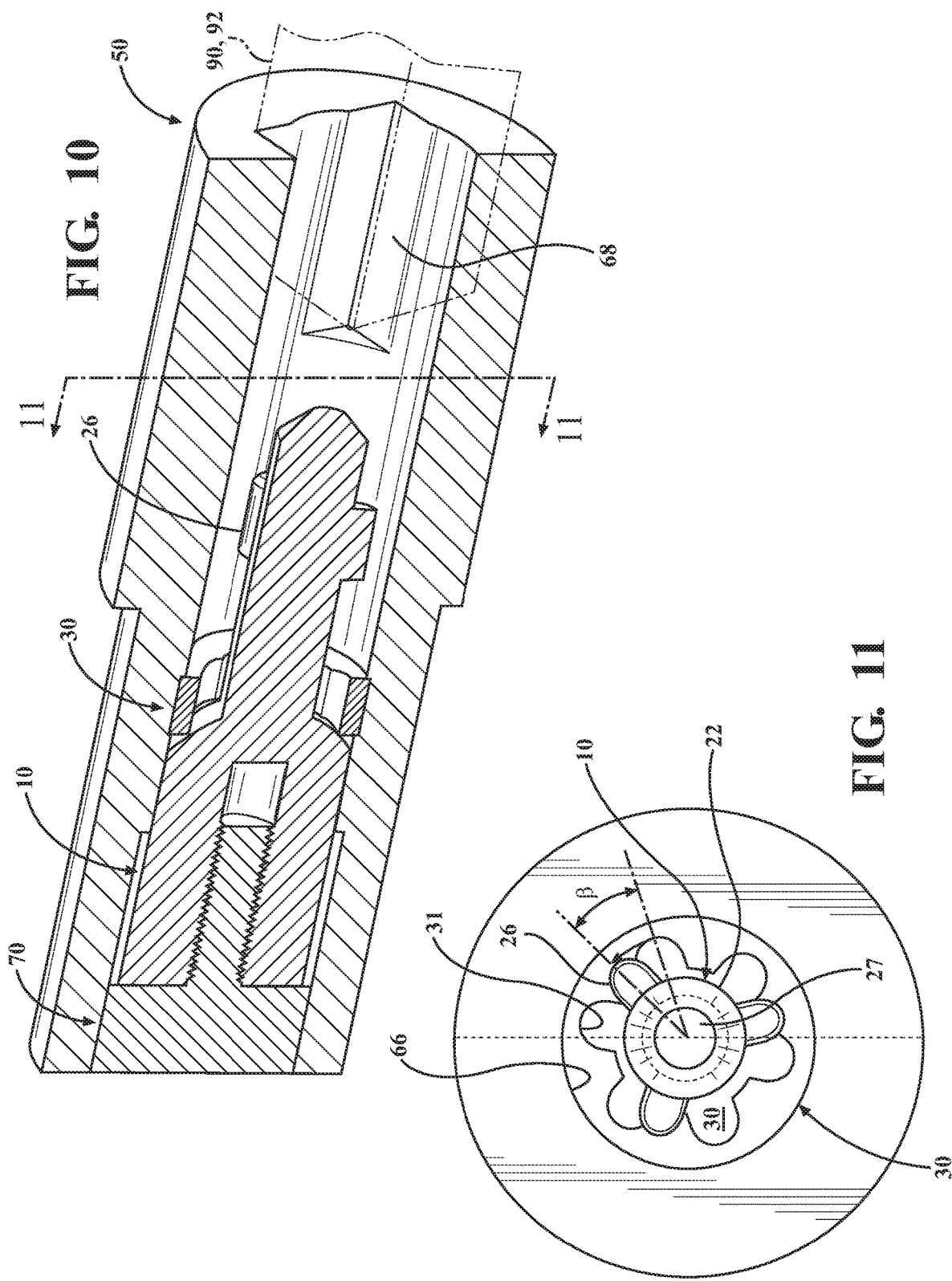

LOCKABLE SOCKET INSERT, INSERT TOOL AND INSERT LOCK AND METHOD OF MAKING AND USING THE SAME

FIELD OF THE INVENTION

The embodiments disclosed herein relate generally to a lockable socket insert and a method of making and using the same, and more particularly to a lockable socket insert for a wheel lug key and a method of making and using the same.

BACKGROUND

Sockets, such as hex shaped sockets, are widely used with socket drives to tighten and loosen threaded bolts and nuts in countless applications. Sockets and socket drives are frequently used for tightening and loosening lug bolts and/or nuts for automotive vehicles and are used during all stages of their lifecycle from vehicular manufacturing and assembly to consumer use and service to scrap and disassembly. Sockets are particularly useful for vehicle manufacturing and assembly and a plurality of sockets are frequently used in conjunction with multi-spindle drives to apply torque and tighten all of the threaded lug bolts or nuts of a wheel simultaneously.

In some applications, including use in multi-spindle drives, the sockets are used to hold tools, such as lug keys, used to attach locking lug bolts or nuts. Occasionally these tools become partially engaged with the mating bolt or nut and are pulled out of the socket as the drive is withdrawn from the locking bolt or nut. In a manufacturing setting, this is very undesirable because it causes lost assembly time to recover and reinsert the tool and can cause stoppage of an entire assembly line. Urethane friction rings have been inserted into the sockets to retain the tools by increasing the friction between the tools and the sockets. While useful, the frictional retention of the friction rings changes as a function of wear, temperature, and other factors.

Therefore, it would be very desirable to develop an improved device for retaining tools in sockets.

SUMMARY OF THE INVENTION

In one embodiment, a lockable socket insert and insert lock is disclosed. The lockable socket insert and insert lock comprises: a lockable socket insert comprising an insert axis, a cylindrical tool body comprising an free end, a shaft end, and a tool bore extending inwardly from the free end, and a cylindrical key shaft attached to the shaft end comprising a length, a shaft surface, and a plurality of circumferentially spaced key members disposed along the length and protruding radially outwardly away from the shaft surface, the cylindrical tool body, tool bore, and cylindrical key shaft concentric about the insert axis; and a cylindrical insert lock comprising an outer end configured for disposition toward the fastener pocket, a drive pocket end configured for disposition toward the drive pocket, an outer surface, and a keyway opening.

In one embodiment, a method of making a lockable socket insert and insert lock is disclosed. The method of making a lockable socket insert and insert lock comprises: forming a lockable socket insert comprising an insert axis, a cylindrical tool body comprising an free end, a shaft end, and a tool bore extending inwardly from the free end, and a cylindrical key shaft attached to the shaft end comprising a length, a shaft surface, and a plurality of circumferentially spaced key members disposed along the length and protruding radially outwardly away from the shaft surface, the cylindrical tool body, tool bore, and cylindrical key shaft concentric about the insert axis; and forming a cylindrical insert lock comprising an outer end configured for disposition toward the fastener pocket, a drive pocket end configured for disposition toward the drive pocket, an outer surface, and a keyway opening.

In one embodiment, a method of using a lockable socket insert and insert lock is disclosed. The method of using a lockable socket insert and insert lock comprises: forming a lockable socket insert comprising an insert axis, a cylindrical tool body comprising an free end, a shaft end, and a tool bore extending inwardly from the free end, and a cylindrical key shaft attached to the shaft end comprising a length, a shaft surface, and a plurality of circumferentially spaced key members disposed along the length and protruding radially outwardly away from the shaft surface, the cylindrical tool body, tool bore, and cylindrical key shaft concentric about the insert axis; forming a cylindrical insert lock comprising an outer end configured for disposition toward the fastener pocket, a drive pocket end configured for disposition toward the drive pocket, an outer surface, and a keyway opening; forming a socket tool comprising a regular polygon-shaped tool body comprising an outward end, an inward end, a plurality of flat tool sides, a corresponding plurality of angular tool corners, and a tool disposed on the outward end, and an attachment shaft disposed on the inward end, the attachment shaft configured for fixed engagement in the tool bore, wherein the regular polygon-shaped tool body is configured for slidable nested mating engagement within the regular polygon-shaped fastener pocket; attaching the socket tool to the lockable socket insert by fixing the attachment shaft within the tool bore; disposing the cylindrical insert lock within a socket, the socket comprising a socket axis, a fastener end, a drive end, a regular polygon-shaped fastener pocket having a pocket center disposed on the socket axis and comprising a plurality of flat pocket sides and a corresponding plurality of angular pocket corners extending from the fastener end to a base, and a socket bore that extends from the base to a drive pocket disposed in the drive end, the cylindrical lock insert disposed in the socket bore with the outer surface in an interference condition in the socket bore with the drive pocket end located at a predetermined depth from the base; and inserting socket tool and lockable socket insert into the socket with the cylindrical tool body inserted into the polygonal-shaped fastener pocket and engagement in the socket bore and the cylindrical key shaft and circumferentially spaced key members in slidable mating engagement as a key in and for passage through the keyway opening, wherein when the cylindrical lock insert is disposed in the socket bore and when the key is disposed in the keyway opening, the plurality of angular tool corners of the tool body are offset from the plurality of angular pocket corners of the regular polygon-shaped fastener pocket by an offset angle, and wherein the regular polygon-shaped tool body may not be inserted into the regular polygon-shaped fastener pocket of the socket.

The above features and advantages and other features and advantages of the invention are readily apparent from the following detailed description of the invention when taken in connection with the accompanying drawings.

BRIEF DESCRIPTION OF THE DRAWINGS

Other features, advantages and details appear, by way of example only, in the following detailed description of embodiments, the detailed description referring to the drawings in which:

FIG. 1 is a side view of an embodiment of a lockable socket tool insert, as described herein;

FIG. 2 is a bottom view of the lockable socket insert of FIG. 1;

FIG. 3 is a top view of an embodiment of an insert lock, as described herein;

FIG. 4 is side view of the insert lock of FIG. 3;

FIG. 5 is a top view of an embodiment of socket tool for disposition in a lockable socket tool insert, as described herein;

FIG. 6 is a side view of the socket tool of FIG. 5;

FIG. 10 is a cross sectional perspective view of the method of FIGS. 7 and 8, wherein the tool/insert assembly has been rotated to eliminate the angular offset and the socket engagement surface has been inserted into and is in mating engagement with the socket opening; and FIG. 11 is a bottom view of the tool/insert assembly and lock/socket assembly in the position of FIG. 10, wherein the tool/insert assembly is captured in the lock/socket assembly by the angular offset between the insert key of the lockable socket tool insert and the key opening of the insert lock.

DESCRIPTION OF THE EMBODIMENTS

Figure 7:
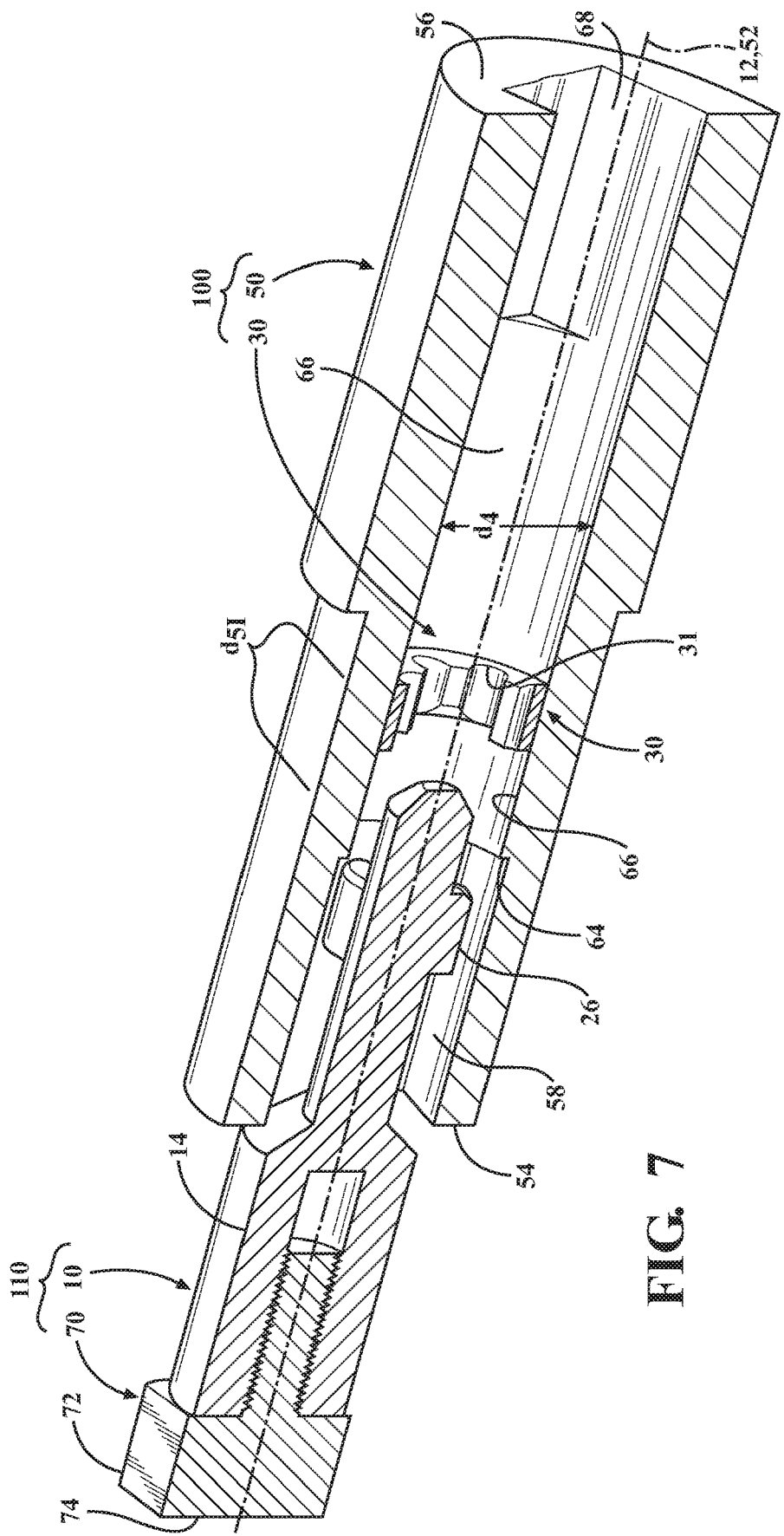
FIG. 7 is a cross sectional perspective view of a method of using embodiments of a socket tool, lockable socket tool insert, and insert lock, wherein the socket tool is disposed in the lockable socket tool insert to form a tool/insert assembly and the insert lock is disposed in a socket as a socket to form a lock/socket assembly, and wherein the tool/insert is partially inserted into the socket above the insert lock.

The invention comprises a positive locking mechanism for retention of a wheel lock key socket used to torque wheel lock fasteners, such as wheel lock lug nuts or wheel lock lug studs, used for automotive vehicles. Wheel lock key sockets are particularly useful for vehicle manufacturing and assembly, and a plurality of sockets, including a wheel lock key socket and a plurality of wheel lug sockets, are frequently used in conjunction with multi-spindle drives to apply torque and tighten all of the threaded lug bolts or nuts of a wheel simultaneously during vehicle manufacturing and assembly. The invention includes a lockable socket insert and a cylindrical insert lock. The lockable socket insert is used to attach a hexagonal socket tool that has on its outer face a wheel lock key pattern, such as a raised or recessed key pattern, which is designed to engage the corresponding complementary mating key pattern of a wheel lug nut or wheels lug stud. The lockable socket insert also has protruding key members on a key shaft socket that act as a key. The cylindrical insert lock is designed to be pressed into a socket bore of a socket having a hexagonal size that corresponds to the size of the hexagonal socket tool. The cylindrical insert lock insert includes a keyway opening that is designed to receive the key. Once the key of the socket tool and lockable socket insert has been inserted through the keyway opening, rotating the key enables the socket tool to be inserted into the socket. The rotation causes misalignment of the key and the keyway opening, thereby locking the socket tool into the socket. The use of these components to provide the locked engagement of the socket tool in the socket is very advantageous because it avoids the problems of the prior art. The invention greatly reduces or eliminates instances of the hexagonal socket tool that includes the wheel lock key being pulled out of the socket as the socket drive, such as a multi-spindle drive, is withdrawn from a wheel after tightening the wheel on an automotive assembly line. The reduction or elimination of socket pull out advantageously reduces assembly line delays and/or stoppages and improves vehicle throughput and assembly productivity.

As used herein, the terms front or forward or rear or rearward or aft refer to the front or rear of the article or vehicle, or to a direction toward the front or rear of the article or vehicle, respectively. The term longitudinal or along the length refers to a direction that extends along or generally parallel to an article or vehicle centerline between the front and the rear, or from one end to an opposed end. The term lateral or along the width or left-right refers to a direction that is orthogonal, or substantially orthogonal, to the longitudinal direction. The terms up or upward or down or downward refer to the top or bottom of the article or vehicle, or to a direction substantially toward the top or bottom of the article or vehicle, respectively. The terms in or inner or inward refer to a direction toward the center of the article or vehicle, and out or outer or outward refers to the opposite direction away from the center or central portion of the article or vehicle.

Referring to FIGS. 1-11, a lockable socket insert 10 and insert lock 30 are described. The insert lock 30 comprises a generally cylindrical body with a keyway opening 38 configured for pressed insertion and an interference fit within a socket 50. The lockable socket insert 10 comprises a generally cylindrical device that is configured for attachment of a socket tool 70 on one end and configured for insertion of a key 28 disposed on another end into and through the socket 50 and keyway opening 38 of the insert lock 30. The socket tool 70 and lockable socket insert 10 and key 28 may then be rotated and inserted further into the socket 50 to dispose the socket tool 70 and lockable socket insert 10 within the socket 50 in locked engagement. The locked engagement of the socket tool 70 in the socket 50 advantageously allows the socket tool and socket to be used with a socket drive 90, such as a partially automated socket drive comprising one socket drive of a multi-spindle socket drive machine 92, and avoids the problem of prior art socket tools used in prior art sockets and socket drives, namely, the socket being pulled off from the socket drive as it is withdrawn after use when the tool face of the socket tool occasionally becomes momentarily stuck on the fastener being driven by the socket by friction or small deformation of the socket tool and/or the fastener, or for other reasons. The lockable socket insert 10, insert lock 30, socket 50, and socket tool 70, as well as methods of making and using them are described further below.

Referring to FIGS. 1-4, lockable socket insert 10 is generally cylindrical and comprises an insert axis 12. The lockable socket insert 10 also comprises a cylindrical tool body 14 comprising an free end 16, a shaft end 18, and a tool bore 20 extending inwardly from the free end. The cylindrical tool body 14 may have any suitable body diameter ($d_1$) and length ($l_1$) selected to fit within the regular polygon-shaped fastener pocket 58 of socket 50 as described herein. In one embodiment, the tool bore 20 comprises a threaded tool bore. The threaded tool bore may have any suitable bore diameter and thread pitch, including conventional English and/or metric pitch sizes, and is configured to receive a threaded fastener having a mating diameter and thread pitch. The lockable socket insert 10 also comprises a cylindrical key shaft 22 attached to the shaft end 18 comprising a diameter ($d_2$) and length ($l_2$), a shaft surface 24, and a plurality of circumferentially spaced key members 26 disposed along the length and protruding radially outwardly away from the shaft surface 24, the cylindrical tool body, tool bore, and cylindrical key shaft are concentric about the insert axis 12. The cylindrical key shaft 22 may have any suitable shaft diameter ($d_2$) and length ($l_2$) selected to fit within and extend into the socket 50, particularly socket bore 66. In one embodiment, the body diameter ($d_1$) is greater than the shaft diameter ($d_2$), more particularly the body diameter ($d_1$) is 1.5-3 times greater than the shaft diameter ($d_2$). In one embodiment, the body length ($l_2$) is less than the shaft length ($l_2$), more particularly the body length ($l_1$) is 0.5-0.75 of the shaft length ($l_2$). The plurality of circumferentially spaced key members 26 disposed along the length and protruding radially outwardly away from the shaft surface 24 may have any suitable size, shape, and circumferential spacing about the shaft surface, and may exist in any suitable number. The plurality of circumferentially spaced key members 26 may also protrude radially outwardly any suitable distance from the shaft surface 24. In one embodiment, the plurality of circumferentially spaced key members 26 comprise a key 28 that is configured to operate cooperatively with the keyway opening 38 of the insert lock 30 to allow mating engagement insertion of the key into the keyway opening and slidable passage of the key through the keyway opening in an insertion orientation of the key, and upon rotation of the key to a locked orientation, to limit or prevent withdrawal of the key through the keyway opening. The lockable socket insert 10 may also include a tapered shoulder 21 that transitions from the body surface 23 of the cylindrical tool body 14 to the shaft surface 24 of the cylindrical key shaft 22. The tapered shoulder 21 also provides a lead in surface to guide the cylindrical tool body 14 into the socket bore 66 upon insertion of the lockable socket insert 10 into the socket 50. The lockable socket insert 10 may also include a tapered shoulder 25 that transitions from the shaft surface 24 to the shaft free end 27 of the cylindrical key shaft 22. The tapered shoulder 25 also provides a lead in surface to guide the cylindrical key shaft into the socket bore 66 upon insertion of the lockable socket insert 10 into the socket 50. The lockable socket insert 10 may be made from any suitable material including various metals, such as, for example, various alloys of steel.

In one embodiment, the key members 26 comprise a plurality of circumferentially spaced arch shape lobes (FIGS. 1 and 2) and the keyway opening 38 comprises a plurality of circumferentially spaced arch shape recesses 31 (FIGS. 3 and 4) that are configured to receive the arch shape lobes in slidable mating engagement, that is the key members are configured to fit within, engage the walls of, and then pass through the recesses when the key is inserted into the keyway opening. In one embodiment, the plurality of circumferentially spaced key members 26 comprising arch shape lobes comprises a number of circumferentially spaced arch shape lobes that are equally spaced circumferentially from one another, and the plurality of circumferentially spaced arch shape recesses 31 comprise a number of circumferentially spaced arch shape recesses that is an integer multiple (e.g. 1-3) of the number of circumferentially spaced arch shape lobes. In one embodiment, the number of circumferentially spaced arch shape lobes is 3 and the number of circumferentially spaced arch shape recesses is 6 as shown in FIGS. 1-3.

The lockable socket insert 10 and insert lock 30 also comprises an insert lock 30. The insert lock 30 is generally cylindrical and is configured for pressed insertion and an interference fit within the socket bore 66 of the socket 50. The insert lock 30 comprises an outer end 32 configured for disposition toward the regular polygon-shaped fastener pocket 58 of socket 50, a drive pocket end 34 configured for disposition toward the drive pocket 68 of socket 50, an outer surface 36 that is cylindrical, and the keyway opening 38. The insert lock 30 may have any suitable lock diameter ($d_3$) and height ($h_3$). The lock diameter ($d_3$) is selected and configured to provide a mating interference fit and an interference condition within the socket bore 66 when pressed therein. Thus, the lock diameter ($d_3$) is greater than the diameter ($d_4$) of the socket bore 66.

In one embodiment, the lockable socket insert 10 and 30 are designed for use with and further comprise a socket 50 comprising a socket axis 52, a fastener end 54, a drive end 56, a regular polygon-shaped fastener pocket 58 disposed in the fastener end and having a pocket center ($C_P$) disposed on the socket axis. The regular polygon-shaped fastener pocket 58 comprising a plurality of flat pocket sides 60 that extend parallel to the socket axis and define the polygon shape (e.g. a hexagon, octagon, or dodecagon) and a corresponding plurality of angular pocket corners 62 defined by the intersection of the flat pocket sides extending from the fastener end to a base 64, and a socket bore 66 that extends from the base to a drive pocket 68 disposed in the drive end. The socket 50, particularly regular polygon-shaped fastener pocket 58, may be of any suitable socket size (i.e. spacing between opposing flat pocket sides 60), including conventional English and metric socket sizes). The socket size will be selected to be the same as the size of the socket tool 70 to enable the nested mating engagement of the socket tool 70 within the regular polygon-shaped fastener pocket 58, as described herein. The insert lock 30 is configured for disposition in the socket bore 66 with the outer surface 36 in an interference condition in the socket bore 66 with the drive pocket end 34 located at a predetermined depth ($d_{SI}$) from the base 64. The cylindrical tool body 14 is configured for insertion into the regular polygon-shaped fastener pocket 58 and engagement in the socket bore 66, the cylindrical key shaft 22 and circumferentially spaced key members 26 are configured for slidable mating engagement as a key 28 in and for passage through the keyway opening 38. The predetermined depth ($d_{SI}$) of the insert lock 30 is selected to enable the key 28 to pass through the keyway opening 38 before the tapered shoulder 21 is stopped by the base 64 during insertion of the lockable socket insert 10, as described herein. Once the insert lock 30 is disposed in the socket bore 66 as shown in FIG. 7, for example, the insert lock 30 and socket 50 comprise a lock/socket assembly 100.

Referring to FIGS. 5 and 6, in one embodiment, the lockable socket insert 10 and 30 are designed for use with and further comprise a socket tool 70. The socket tool 70 comprises a regular polygon-shaped tool body 72 that includes an outward end 74 configured for disposition away from the lockable socket insert 10, an inward end 76 configured for disposition toward from the lockable socket insert 10, a plurality of flat tool sides 78 configured for axial alignment parallel to the socket axis and arranged in a regular polygon-shape, a corresponding plurality of angular tool corners 80 defined by the intersection of the flat tool sides, and a tool 82 disposed on the outward end. The tool 82 configured to engage an article (not shown) in mating engagement. In one embodiment, the tool 82 comprises a locking lug key 83 comprising key pattern 84 defined between the inner sidewall 85 and outer sidewall 87 comprising a lock recess 86 disposed in the outward end 74 configured for radial disposition about the insert axis 12 and configured for mating engagement with an article (not shown) comprising a locking wheel lug nut or wheel lug bolt with a mating protruding lock pattern as is known in the art. Alternately, features of the lock pattern may be reversed (not shown) and the tool 82 may comprise a key pattern comprising a lock protrusion disposed in the outward end configured for radial disposition about the insert axis and configured for mating engagement with an article (not shown) comprising a locking lug nut or lug bolt with a mating recessed lock pattern as is also known in the art.

The socket tool 70 also comprises an attachment shaft 88 disposed on the inward end, the attachment shaft configured for fixed engagement in the tool bore 20, wherein the regular polygon-shaped tool body 72 is configured for slidable nested mating engagement within the regular polygon-shaped fastener pocket 58. In one embodiment, the tool bore 20 comprises a threaded bore and the attachment shaft 88 comprises a threaded shaft configured for fixed engagement in the threaded bore by tightenably threading the threaded shaft into the threaded bore. Once the socket tool 70 is attached to the lockable socket insert 10 as shown in FIG. 7, for example, the socket tool 70 and lockable socket insert 10 comprise a tool/insert assembly 110.

Figure 8:
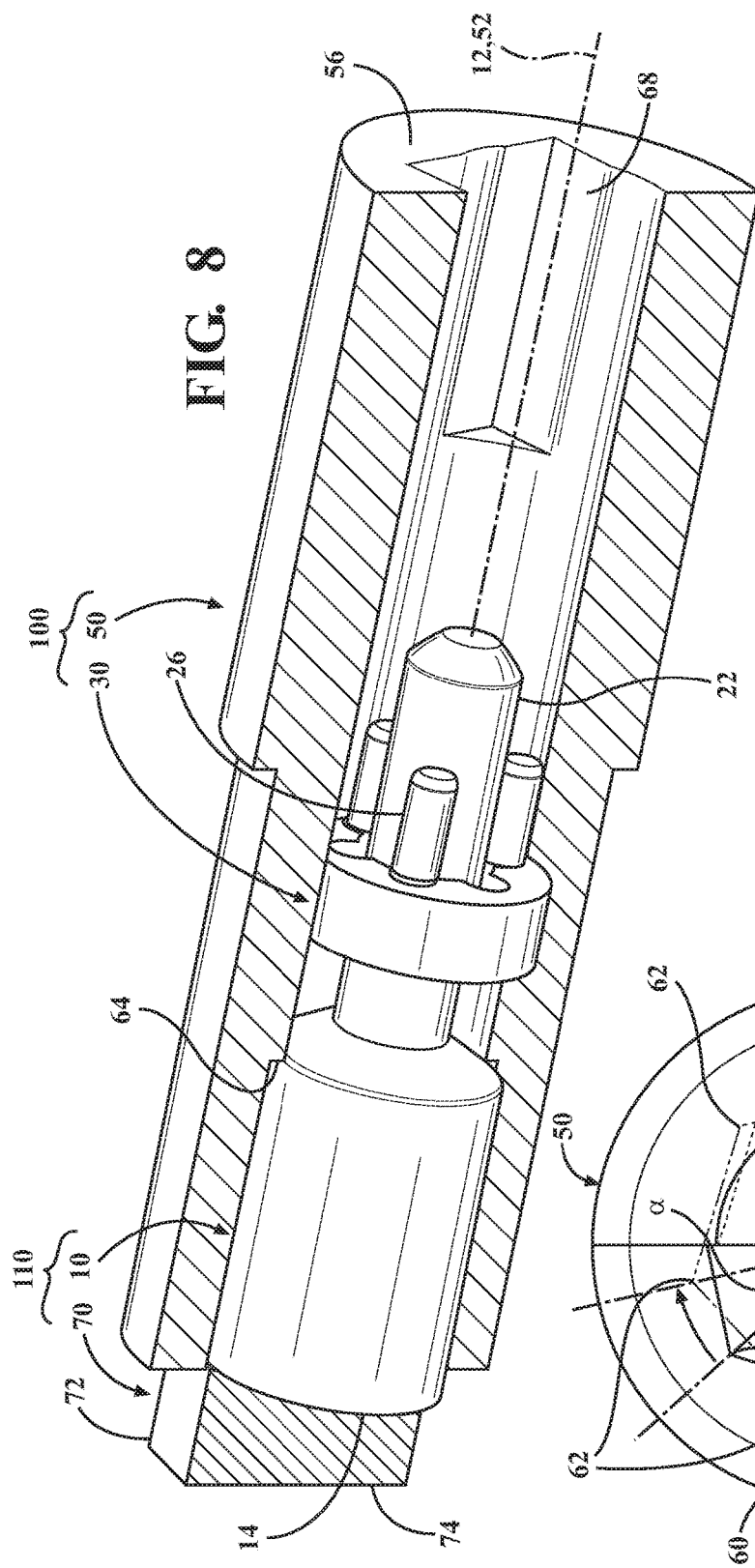
FIG. 8 is a cross sectional perspective view of the method of FIG. 7 wherein the tool/insert assembly is partially inserted further into lock/socket assembly and an insert key has been inserted through a mating key opening of the insert lock, but is in the same orientation of the tool/insert assembly relative to the lock/socket assembly as though the key were still in the keyway opening.
Figure 9:
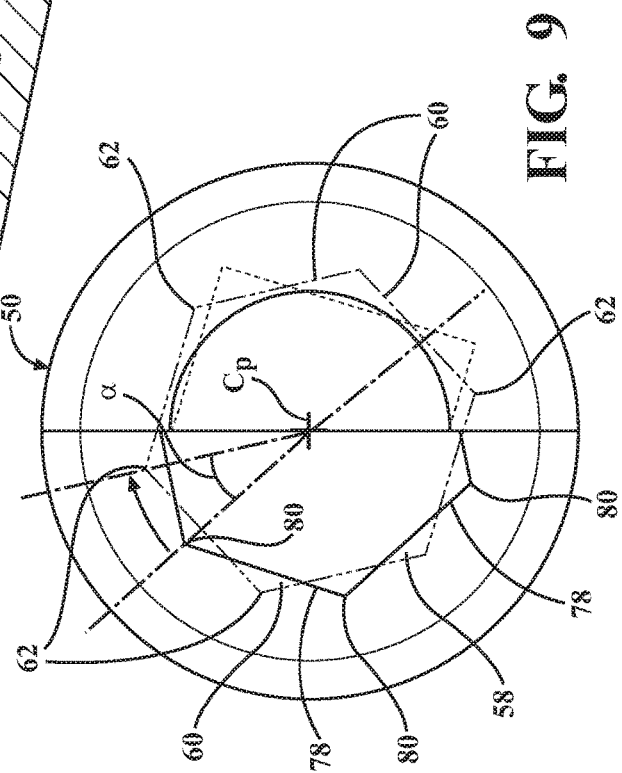
FIG. 9 is a top partial cut-away view of the tool/insert assembly and lock/socket assembly in the position of FIG. 8, wherein the angular offset of the positions of the socket engagement surface of the socket tool and the matingly engageable socket openings are illustrated.

Referring to FIGS. 8 and 9 in one embodiment, when the insert lock 30 is disposed in the socket bore 66 and when the key 28 is disposed in the keyway opening 38, the plurality of angular tool corners 80 are offset from the plurality of angular pocket corners 62 by an offset angle ($\alpha$), and the regular polygon-shaped tool body 72 of the socket tool 70 may not be inserted into the regular polygon-shaped fastener pocket 58 of the socket 50. Referring to FIG. 10, when the tool/insert assembly 110, and particularly lockable socket insert 10, is disposed in the socket bore 66 and when the key 28 has passed through the keyway opening 38, the tool/insert assembly 110, and particularly socket tool 70, may be rotated by the offset angle ($\alpha$) to provide axial alignment of the plurality of angular tool corners 80 and the plurality of angular pocket corners 62, wherein the regular polygon-shaped tool body 72 is configured for insertion into and slidable nested mating engagement within the regular polygon-shaped fastener pocket 58 and a seated condition (FIG. 10) of the tool/insert assembly 110. In the seated condition, the key members 26 and keyway opening 38 are angularly offset by the lock offset angle ($\beta$) and the socket tool 70 and lockable socket insert 10 of the tool/insert assembly 110 are locked within the socket 50.

In one embodiment, the regular polygon-shaped tool body 72 and regular polygon-shaped fastener pocket 58 are hexagonal, octagonal, or dodecagonal.

Referring to FIG. 10, in one embodiment, the lockable socket insert 10 and 30 are designed for use with and further comprise a socket drive 90, the socket drive configured for selective attachment and detachment of the socket 50 by insertion into the drive pocket 68. In one embodiment, the socket drive 90 comprises a single spindle of a multi-spindle drive machine 92.

Referring to FIGS. 1-11, in one embodiment, a method of making a lockable socket insert 10 and insert lock 30 is disclosed, and comprises: forming a lockable socket insert 10 comprising an insert axis 12, a cylindrical tool body 14 comprising an free end 16, a shaft end 18, and a tool bore 20 extending inwardly from the free end 16, and a cylindrical key shaft 22 attached to the shaft end 18 comprising a length ($l_2$), a shaft surface 24, and a plurality of circumferentially spaced key members 26 disposed along the length ($l_2$) and protruding radially outwardly away from the shaft surface 24, the cylindrical tool body 14, tool bore 20, and cylindrical key shaft 22 concentric about the insert axis 12. The method also comprises forming an insert lock 30 comprising an outer end 32 configured for disposition toward the regular polygon-shaped fastener pocket 58, a drive pocket end 34 configured for disposition toward the drive pocket 68, an outer surface 36, and a keyway opening 38. The forming of the lockable socket insert 10 and insert lock 30 may be performed by any suitable metal part fabrication method, including casting, forging, machining, and like, or combinations thereof.

Referring to FIGS. 1-11, in one embodiment, a method of using a lockable socket insert 10 and insert lock 30 is disclosed, and comprises forming a lockable socket insert 10 comprising an insert axis 12, a cylindrical tool body 14 comprising an free end 16, a shaft end 18, and a tool bore 20 extending inwardly from the free end 16, and a cylindrical key shaft 22 attached to the shaft end 18 comprising a length ($l_2$), a shaft surface 24, and a plurality of circumferentially spaced key members 26 disposed along the length ($l_1$) and protruding radially outwardly away from the shaft surface 24, the cylindrical tool body 14, tool bore 20, and cylindrical key shaft 22 concentric about the insert axis 12. The method of using also comprises forming an insert lock 30 comprising an outer end 32 configured for disposition toward the regular polygon-shaped fastener pocket 58, a drive pocket end 34 configured for disposition toward the drive pocket 68, an outer surface 36, and a keyway opening 38. The method of using also comprises forming a socket tool 70 comprising a regular polygon-shaped tool body 72 comprising an outward end 74, an inward end 76, a plurality of flat tool sides 78, a corresponding plurality of angular tool corners 80, and a tool 82 disposed on the outward end 74, and an attachment shaft 88 disposed on the inward end 76, the attachment shaft configured for fixed engagement in the tool bore 20, wherein the regular polygon-shaped tool body 72 is configured for slidable nested mating engagement within the regular polygon-shaped fastener pocket 58. The method of using also comprises attaching the socket tool 70 to the lockable socket insert 10 by fixing the attachment shaft 88 within the tool bore 20. The method of using also comprises disposing the insert lock 30 within a socket 50, the socket 50 comprising a socket axis 52, a fastener end 54, a drive end 56, a regular polygon-shaped fastener pocket 58 having a pocket center disposed on the socket axis 52 and comprising a plurality of flat pocket sides 60 and a corresponding plurality of angular pocket corners 62 extending from the fastener end 54 to a base 64, and a socket bore 66 that extends from the base 64 to a drive pocket 68 disposed in the drive end 56, the insert lock 30 disposed in the socket bore 66 with the outer surface 36 in an interference condition in the socket bore 66 with the drive pocket end 34 located at a predetermined depth ($d_{SI}$) from the base 64. The method of using also comprises inserting socket tool 70 and lockable socket insert 10 into the socket 50 with the tool body 72 inserted into the regular polygon-shaped fastener pocket 58 and engagement in the socket bore 66 and the cylindrical key shaft 22 and circumferentially spaced key members 26 in slidable mating engagement as a key 28 in and for passage through the keyway opening 38, wherein when the insert lock 30 is disposed in the socket bore 66 and when the key 28 is disposed in the keyway opening 38, the plurality of angular tool corners 80 of the tool body 72 are offset from the plurality of angular pocket corners 62 of the regular polygon-shaped fastener pocket 58 by an offset angle (α), and wherein the regular polygon-shaped tool body 72 may not be inserted into the regular polygon-shaped fastener pocket 58 of the socket 50.

In one embodiment, the method of using also comprises continuing to insert the key 28 through the keyway opening 38. In one embodiment, the method of using further comprises rotating the socket tool by the offset angle to provide axial alignment of the plurality of angular tool corners 80 and the plurality of angular pocket corners 62, and sliding the regular polygon-shaped tool body 72 into nested mating engagement within the regular polygon-shaped fastener pocket 58 and a seated condition. In this embodiment of the method of using, rotating and inserting results in the seated condition, and the circumferentially spaced key members 26 and keyway opening 38 are angularly offset by locked offset angle (β) and the socket tool 70 and lockable socket insert 10 are locked within the socket 50.

In one embodiment, the method of using further comprises inserting the socket 50 onto a socket drive 90, wherein the socket drive is configured for selective attachment and detachment of the socket 50 by insertion into the drive pocket 68. In one embodiment of the method of using, the socket drive 90 comprises a spindle of a multi-spindle socket drive machine 92.

The terms "a" and "an" herein do not denote a limitation of quantity, but rather denote the presence of at least one of the referenced items. The modifier "about" used in connection with a quantity is inclusive of the stated value and has the meaning dictated by the context (e.g., includes the degree of error associated with measurement of the particular quantity). Furthermore, unless otherwise limited all ranges disclosed herein are inclusive and combinable (e.g., ranges of "up to about 25 weight percent (wt. %), more particularly about 5 wt. % to about 20 wt. % and even more particularly about 10 wt. % to about 15 wt. %" are inclusive of the endpoints and all intermediate values of the ranges, e.g., "about 5 wt. % to about 25 wt. %, about 5 wt. % to about 15 wt. %", etc.). The use of "about" in conjunction with a listing of items is applied to all of the listed items, and in conjunction with a range to both endpoints of the range. Finally, unless defined otherwise, technical and scientific terms used herein have the same meaning as is commonly understood by one of skill in the art to which this invention belongs. The suffix "(s)" as used herein is intended to include both the singular and the plural of the term that it modifies, thereby including one or more of that term (e.g., the metal(s) includes one or more metals). Reference throughout the specification to "one embodiment", "another embodiment", "an embodiment", and so forth, means that a particular element (e.g., feature, structure, and/or characteristic) described in connection with the embodiment is included in at least one embodiment described herein, and may or may not be present in other embodiments.

It is to be understood that the use of "comprising" in conjunction with the components or elements described herein specifically discloses and includes the embodiments that "consist essentially of" the named components (i.e., contain the named components and no other components that significantly adversely affect the basic and novel features disclosed), and embodiments that "consist of" the named components (i.e., contain only the named components).

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A tool/lockable socket insert assembly and insert lock, comprising:
    a tool/lockable socket insert assembly including a socket insert having an insert axis, a cylindrical tool body comprising a free end, a shaft end, and a tool bore extending inwardly from the free end, and a cylindrical key shaft attached to the shaft end comprising a length, a shaft surface, and a plurality of circumferentially spaced key members disposed along a portion of the length and protruding radially outwardly away from the shaft surface, the cylindrical tool body, tool bore, and cylindrical key shaft concentric about the insert axis, the tool/lockable socket insert assembly also including a socket tool having a regular polygon-shaped tool body and attached to the socket insert;
    a cylindrical insert lock comprising an outer end configured for disposition toward a fastener pocket, a drive pocket end configured for disposition toward a drive pocket, an outer surface, and a keyway opening; and
    a socket including a regular polygon-shaped fastener pocket structured to receive the socket tool body therein in a slidable nested mating engagement,
    wherein the socket insert is rotatable so that the key members of the plurality of key members are insertable into the keyway opening, and wherein the socket tool is attached to the socket insert such that the socket tool body is not insertable into the fastener pocket when the key members are rotated so as to be insertable into the keyway opening.

2. The tool/lockable socket insert assembly and insert lock of claim 1, further comprising a socket comprising a socket axis, a fastener end, a drive end including the drive pocket, wherein the regular polygon-shaped fastener pocket has a pocket center disposed on the socket axis and comprising a plurality of flat pocket sides and a corresponding plurality of angular pocket corners extending from the fastener end to a base, and a socket bore that extends from the base to the drive pocket, the cylindrical insert lock configured for disposition in the socket bore with the outer surface in an interference condition in the socket bore with the drive pocket end located at a predetermined depth from the base, the cylindrical tool body configured for insertion into the polygonal-shaped fastener pocket and engagement in the socket bore, the cylindrical key shaft and circumferentially spaced key members configured for slidable mating engagement as a key in the keyway opening.

3. The tool/lockable socket insert assembly and insert lock of claim 2, wherein the tool body includes an outward end, an inward end, a plurality of flat tool sides, a corresponding plurality of angular tool corners, and a tool disposed on the socket tool outward end, and wherein the-attachment shaft is disposed on the inward end.

4. A tool/lockable socket insert assembly and insert lock of claim 3, wherein the tool bore comprises a threaded bore and the socket tool includes a threaded attachment shaft configured for fixed engagement in the threaded bore.

5. A tool/lockable socket insert assembly and insert lock of claim 3, wherein the tool comprises a lug key for engaging a locking wheel lug bolt or wheel lug nut.

6. A tool/lockable socket insert assembly and insert lock of claim 3, wherein when the cylindrical lock insert is disposed in the socket bore and when the key is disposed in the keyway opening, the plurality of angular tool corners are offset from the plurality of angular pocket corners by an offset angle, and wherein the regular polygon-shaped tool body may not be inserted into the regular polygon-shaped fastener pocket of the socket.

7. A tool/lockable socket insert assembly and insert lock of claim 3, wherein when the cylindrical lock insert is disposed in the socket bore and when the key has passed through the keyway opening, the socket tool may be rotated by an offset angle to provide axial alignment of the plurality of angular tool corners and the plurality of angular pocket corners, and wherein the regular polygon-shaped tool body is configured for insertion into and slidable nested mating engagement within the regular polygon-shaped fastener pocket and a seated condition.

8. A tool/lockable socket insert assembly and insert lock of claim 7, wherein in the seated condition, the key members and keyway opening are angularly offset and the socket tool and lockable socket insert are locked within the socket.

9. A tool/lockable socket insert assembly and insert lock of claim 3, wherein the regular polygon-shaped tool body and regular polygon-shaped fastener pocket are hexagonal or dodecagonal.

10. A tool/lockable socket insert assembly and insert lock of claim 3, further comprising a socket drive, the socket drive configured for selective attachment and detachment of the socket by insertion into the drive pocket.

11. A tool/lockable socket insert assembly and insert lock of claim 10, wherein the socket drive comprises a spindle of a multi-spindle drive machine.

12. A tool/lockable socket insert assembly and insert lock of claim 1, wherein key members comprise a plurality of circumferentially spaced arch shape lobes and the keyway opening comprises a plurality of circumferentially spaced arch shape recesses that are configured to receive the arch shape lobes in mating engagement.

13. A tool/lockable socket insert assembly and insert lock of claim 12, wherein the plurality of circumferentially spaced arch shape lobes comprises a number of circumferentially spaced arch shape lobes that are equally spaced from one another, and wherein the plurality of circumferentially spaced arch shape recesses comprise a number of circumferentially spaced arch shape recesses that is an integer multiple of the number of circumferentially spaced arch shape lobes.

14. A tool/lockable socket insert assembly and insert lock of claim 13, wherein the number of circumferentially spaced arch shape lobes is 3 and the number of circumferentially spaced arch shape recesses is 6.

15. A method of making a tool/lockable socket insert assembly and insert lock, comprising:
forming a tool/lockable socket insert assembly including a socket insert having an insert axis, a cylindrical tool body comprising a free end, a shaft end, and a tool bore extending inwardly from the free end, and a cylindrical key shaft attached to the shaft end comprising a length, a shaft surface, and a plurality of circumferentially spaced key members disposed along the length and protruding radially outwardly away from the shaft surface, the cylindrical tool body, tool bore, and cylindrical key shaft concentric about the insert axis, the tool/lockable socket insert assembly also including a socket tool having a regular polygon-shaped tool body and attached to the socket insert;
forming a cylindrical insert lock comprising an outer end configured for disposition toward a fastener pocket of a socket, a drive pocket end configured for disposition toward a drive pocket, an outer surface, and a keyway opening; and
forming a socket including a regular polygon-shaped fastener pocket structured to receive the socket tool body therein in a slidable nested mating engagement,
wherein the socket insert is rotatable so that the key members of the plurality of key members are insertable into the keyway opening, and wherein the socket tool is attached to the socket insert such that the socket tool body is not insertable into the fastener pocket when the key members are rotated so as to be insertable into the keyway opening.

16. A method of using a lockable socket insert and insert lock, comprising:
forming a lockable socket insert comprising an insert axis, a cylindrical tool body comprising a free end, a shaft end, and a tool bore extending inwardly from the free end, and a cylindrical key shaft attached to the shaft end comprising a length, a shaft surface, and a plurality of circumferentially spaced key members disposed along the length and protruding radially outwardly away from the shaft surface, the cylindrical tool body, tool bore, and cylindrical key shaft concentric about the insert axis;
forming a cylindrical insert lock comprising an outer end configured for disposition toward a fastener pocket of a socket, a drive pocket end configured for disposition toward a drive pocket of the socket, an outer surface, and a keyway opening;
forming a socket tool comprising a regular polygon-shaped tool body comprising an outward end, an inward end, a plurality of flat tool sides, a corresponding plurality of angular tool corners, and a tool disposed on the outward end, and an attachment shaft disposed on the inward end, the attachment shaft configured for fixed engagement in the tool bore, wherein the regular polygon-shaped tool body is configured for slidable nested mating engagement within the regular polygon-shaped fastener pocket;
attaching the socket tool to the lockable socket insert by fixing the attachment shaft within the tool bore;
disposing the cylindrical insert lock within the socket, the socket comprising a socket axis, a fastener end, a drive end, a regular polygon-shaped fastener pocket having a pocket center disposed on the socket axis and comprising a plurality of flat pocket sides and a corresponding plurality of angular pocket corners extending from the fastener end to a base, and a socket bore that extends from the base to a drive pocket disposed in the drive end, the cylindrical lock insert disposed in the socket bore with the outer surface in an interference condition in the socket bore with the drive pocket end located at a predetermined depth from the base; and
inserting socket tool and lockable socket insert into the socket with the cylindrical tool body inserted into the polygonal-shaped fastener pocket and engagement in the socket bore and the cylindrical key shaft and circumferentially spaced key members in slidable mating engagement as a key in and for passage through the keyway opening, wherein when the cylindrical lock insert is disposed in the socket bore and when the key is disposed in the keyway opening, the plurality of angular tool corners of the tool body are offset from the plurality of angular pocket corners of the regular polygon-shaped fastener pocket by an offset angle, and wherein the regular polygon-shaped tool body may not be inserted into the regular polygon-shaped fastener pocket of the socket.

17. The method of using a lockable socket insert and insert lock of claim 16, further comprising:
  continuing to insert the key through the keyway opening; and
  rotating the socket tool by the offset angle to provide axial alignment of the plurality of angular tool corners and the plurality of angular pocket corners; and sliding the regular polygon-shaped tool body into nested mating engagement within the regular polygon-shaped fastener pocket and a seated condition.

18. The method of using a lockable socket insert and insert lock of claim 17, wherein in the seated condition, the key members and keyway opening are angularly offset and the socket tool and lockable socket insert are locked within the socket.

19. The method of using a lockable socket insert and insert lock of claim 17, further comprising:
  inserting the socket onto a socket drive, wherein the socket drive is configured for selective attachment and detachment of the socket by insertion into the drive pocket.

20. The method of using a lockable socket insert and insert lock of claim 17, wherein the socket drive comprises a spindle of a multi-spindle drive machine.

\* \* \* \* \*